Figure 1:
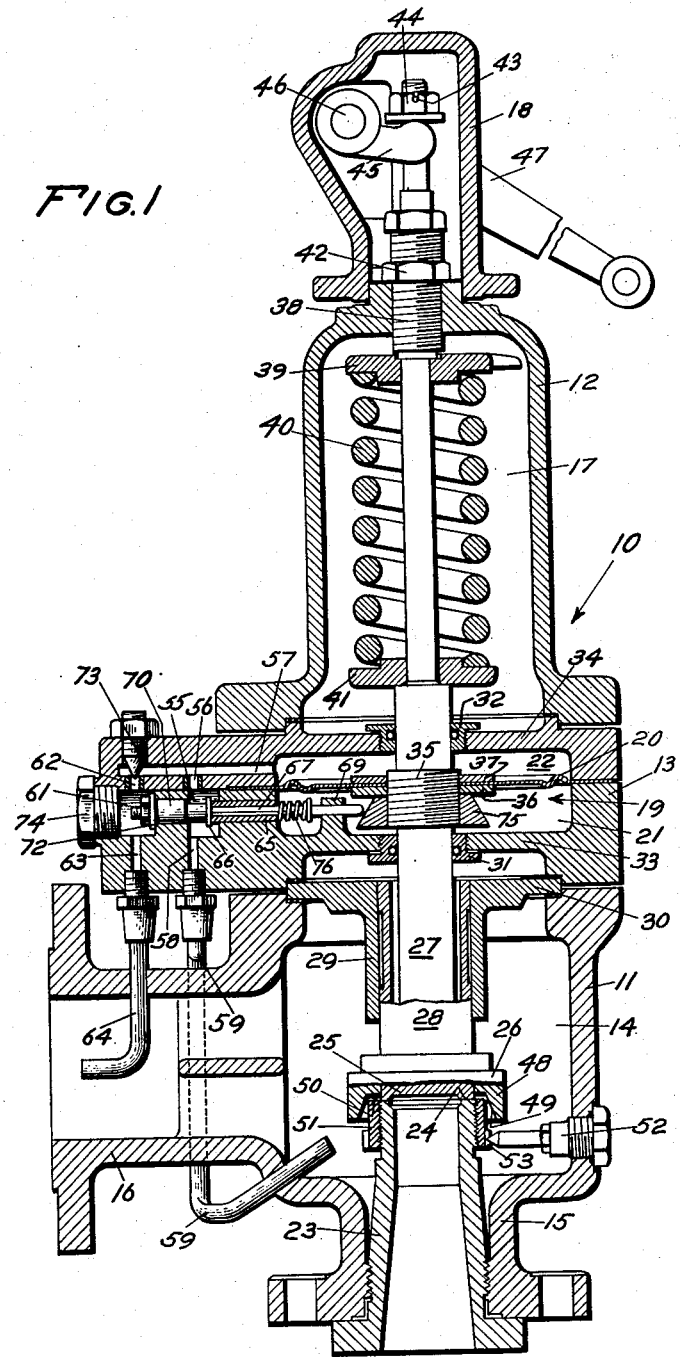
Figure 2:
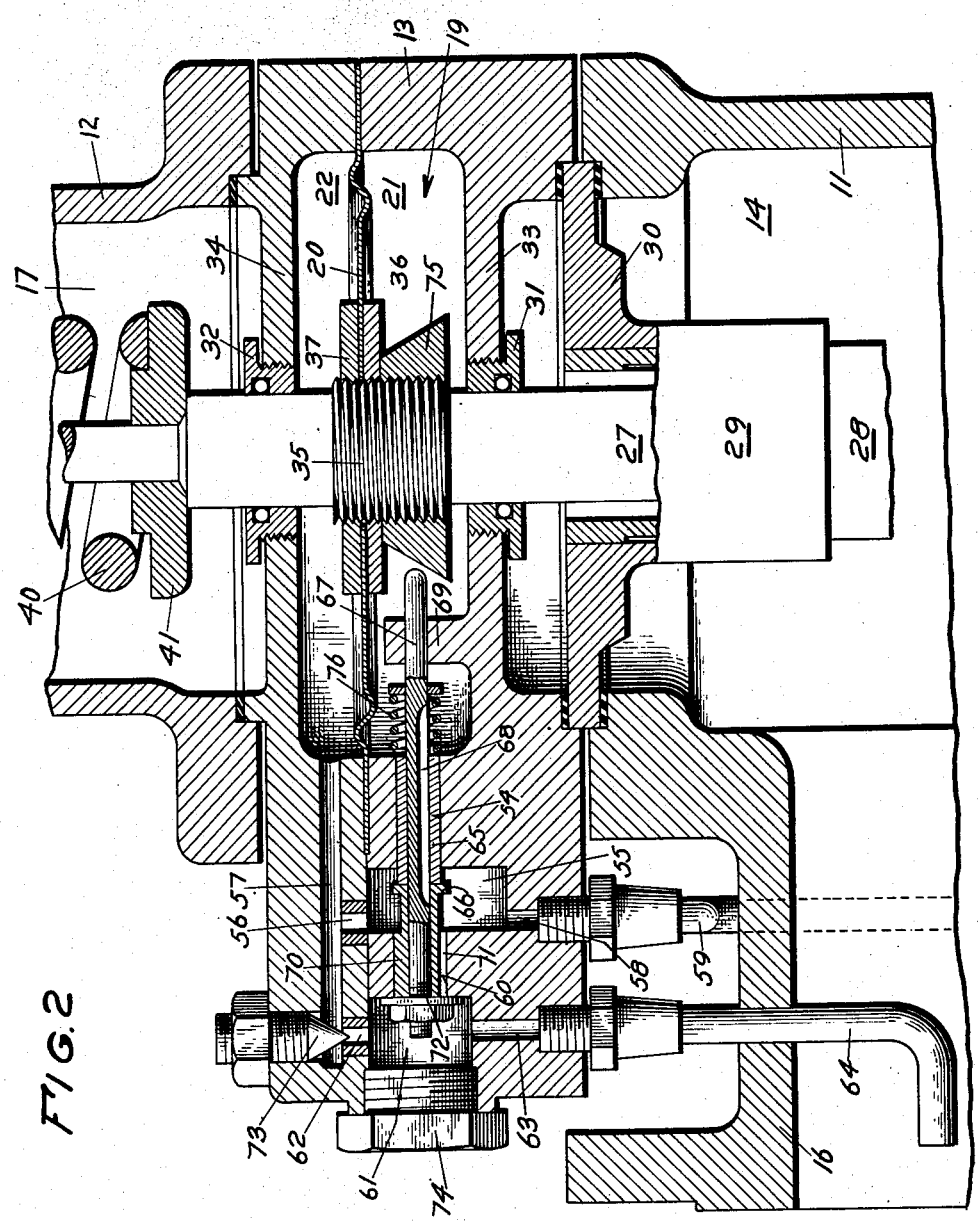

Feb. 16, 1954 V. W. FARRIS 2,669,252
SAFETY VALVE
Filed Feb. 21, 1950 2 Sheets-Sheet 2

INVENTOR
VICTOR W. FARRIS
BY Bernard H. Remlein
ATTORNEY

Patented Feb. 16, 1954

2,669,252

UNITED STATES PATENT OFFICE 2,669,252

SAFETY VALVE

Victor Wallace Farris, Tenafly, N. J.

Application February 21, 1950, Serial No. 145,456

8 Claims. (Cl. 137—472)

1

This invention relates to safety valves, and more particularly, to safety valves intended to handle fluids flowing at high velocities.

In devices of this general character, opening of the valve has heretofore been dependent solely upon the pressure exerted by the fluid being controlled against an adjustable spring load. Even after the initial popping of the valve, the attainment of maximum opening, generally accepted, for maximum efficiency, to be equal to $$\frac{D}{4}$$

where D is the diameter of the discharge orifice, depended upon this same pressure. As a matter of fact, with elastic fluids, the pressure must reach about 3% over the set pressure before $$\frac{D}{4}$$

can be attained, and in the case of inelastic fluids, this over-pressure must reach about 40%. Now, the pressure exerted against the valve disc is partially a function of the shape of the nozzle, a tapered nozzle generally being employed to aid in reaching the necessary over-pressures. But tapered nozzles reduce capacity, thereby increasing the time elapsing before reaching maximum capacity. This lag is detrimental for many applications, and often necessitates the use of larger and more costly valves in an effort to compensate therefor.

The closing of such valves has heretofore been dependent solely upon the reduction of the pressure exerted by the fluid being controlled, the speed of such closing and the pressure at which the valve finally closed being a function of the position of the blow-down ring. This has the disadvantage that the difference between the opening and closing pressures cannot be controlled with as much accuracy as is desirable and the valve is likely to chatter, especially where the valve is desired to blow down close to its set point.

Furthermore, conventional spring-operated valves are subject to spring hysteresis which causes lag during the blow down.

It is, therefore, among the objects of the present invention to provide a safety valve in which the foregoing disadvantages are eliminated.

It is another object of the present invention to provide a safety valve in which the discharging fluid is utilized to aid the opening of the valve, thereby attaining maximum lift and capacity in minimum time.

It is still another object of the present invention to provide a valve in which a straight, rather than a tapered, nozzle may be employed so as to increase capacity, and attain this increased capacity without sacrificing lift.

It is a further object of the present invention to provide a safety valve in which the discharging fluid is also utilized to aid the closing of the valve, thereby giving greater control over the blow-down point than has heretofore been possible, and eliminating chatter.

It is a still further object of the present invention to provide a safety valve the construction and mode of operation of which are such as to enable the use of a smaller valve for a given installation than has heretofore been required.

It is a further object of the present invention to provide a valve in which the effects of spring hysteresis are eliminated.

These, and other objects of the present invention, which will become more apparent as the detailed description thereof progresses, are attained, broadly, in the following manner.

In a preferred form, the present invention contemplates the provision of a valve body having main and auxiliary chambers, the main chamber including means providing communication with the interior thereof. A valve disc cooperates with this means to control the communication therethrough, the pressure at which the disc operates being adjustable. A pressure-responsive member is disposed in the auxiliary chamber to divide the same into first and second compartments, said pressure-responsive member being coupled to the above-mentioned valve disc. Additional means provide communication between said first and second compartments and said main chamber, preferably, at a point located closely adjacent said valve disc so as to be exposed to the maximum velocity of the discharging fluid. The communication between the first compartment and the main chamber is controlled by another valve disc, this disc being operable by effective connection with the first valve disc during the operation of the latter. The first and second compartments of the auxiliary chamber additionally communicate with the main chamber, the additional communication between the first compartment and the mhain chamber being controlled by a third valve disc, in turn, coupled to, and operated in unison with, the second valve disc. Finally, the additional communication between the second compartment and the main chamber is provided with a needle valve to adjustably restrict the orifice thereof.

When the pressure against the first valve disc reaches a predetermined value, this disc starts to open, enabling the fluid being controlled to commence discharging through the main chamber. At the same time, the second and third valve discs open, whereby one portion of the discharging fluid enters the first compartment of the auxiliary chamber to act on the pressure-responsive member therein in a direction to aid the opening of the first valve disc. Another portion of the discharging fluid is by-passed through the third valve disc back to the main chamber so as to prevent this fluid from entering the second compartment of the auxiliary chamber and counteracting the aiding action of the fluid in the first compartment. Thus, the first valve disc is quickly brought to its maximum opening with the aid of the fluid controlled thereby.

As the pressure of said fluid drops, the first valve disc commences to close. During this closing movement, the second and third valve discs also close, cutting off the communication between the first compartment of the auxiliary chamber and the main chamber, and the by-pass of the second compartment to the main chamber. However, inasmuch as the first valve disc is still partially open, a portion of the fluid which continues to discharge is conveyed to the second compartment of the auxiliary chamber. This fluid builds up pressure against the above referred to pressure-responsive member in a direction to aid the closing of the first valve disc, the rate at which this pressure builds up depending on the setting of the needle valve controlling the orifice of the previously mentioned additional communication between the second compartment and the main chamber. If this orifice is small, the pressure builds up rapidly and the first valve disc closes at a pressure near that at which it opened. On the other hand, if this orifice is large, much of the fluid is by-passed back to the main chamber and the pressure against the pressure-responsive member builds up slowly. In this case, the first valve disc closes slowly, and the final pressure at which it becomes completely closed is controlled, primarily, by the position of the conventional blow-down ring of the device. Thus, the discharging fluid is utilized to aid in closing as well as opening the first valve disc, and the disadvantages of existing devices, above set forth, are eliminated.

In the accompanying specification there shall be described, and in the annexed drawing shown, an illustrative embodiment of safety valves. It is, however, to be clearly understood that the present invention is not to be limited to the exact details herein shown and described for purposes of illustration only, inasmuch as changes therein may be made without the exercise of invention and within the true spirit and scope of the claims hereto appended.

Referring now more in detail to the aforesaid illustrative embodiment of the present invention, with particular reference to the drawings illustrating the same, the numeral 10 generally indicates a safety valve including a main body 11, a bonnet 12, and an auxiliary body 13 secured between said main body and said bonnet.

The main body 11 is provided with a main or central chamber 14 and inlet and outlet ports 15 and 16. The bonnet 12 is provided with a spring chamber 17 and a cap 18 at the upper end thereof. The auxiliary body 13 is provided with an auxiliary chamber 19 divided by a peripherally mounted flexible diaphragm 20 into first and second compartments 21 and 22. While the diaphragm 20 is, preferably, made of metal, it may also be made of suitable rubber or the like.

Threadedly engaged in the inlet port 15, and extending into the main chamber 14 of the body 11, is a high velocity nozzle 23 at the inner end of which there is formed a valve seat 24, and cooperable with the seat 24 is a disc 25 carried by a disc-holding member 26.

The disc-holding member 26 is, in turn, coupled to a valve stem 27 which rises upwardly through a sleeve 28 formed with said disc-holding member, said sleeve being slidably mounted in a cylinder 29 supported in spaced axial relationship with the nozzle 23 from a baffle 30 secured at the periphery thereof between the bodies 11 and 13.

The stem 27 passes through packing nuts 31 and 32 in the walls 33 and 34 of the auxiliary body 13, and through a central opening in the diaphragm 20, and extends into the spring chamber 17 of the bonnet 12, said stem having a threaded portion 35 engaging discs 36 and 37 contacting opposite sides of said diaphragm 20 whereby said diaphragm and said stem can move as a unit.

Near its upper end, the stem 27 is slidably mounted in a spring-adjusting screw 38 engaged in the bonnet 12, said screw bearing against a button 39 which is loosely mounted on the stem 27 and which, in turn, bears against the upper end of a coil spring 40 the lower end of which abuts another button 41 which is fastened on the stem 27. The screw 38 is adapted to be locked in position by a nut 42. Threadedly engaged on the outer end of the stem 27, and locked in position thereon by a cotter pin 43, is a stem test nut 44, the underside of said nut being engaged by a cam 45 fixed upon a stud shaft 46 journalled in the cap 18, said shaft also having fixed thereon a test lever 47.

Surrounding the disc 25 and formed on the disc-holding member 26, is a depending flange 48, said flange having an interior surface 49 which flares outwardly from a flat, secondary disc area 50 presented by the under surface of the disc-holding member 26, in a direction opposite to fluid flow through the nozzle 23.

Threadedly engaged adjacent the seat end of the nozzle 23 is a blow-down ring 51 adapted, after suitable adjustment, to be fixed in position by a locking screw 52 carried in the main body 11 and engageable with serrations 53 formed about said ring.

The auxiliary body 13 is provided with a bore 54 communicating between the first compartment 21 thereof and a sub-chamber 55 formed therein, said sub-chamber communicating in one direction, through a port 56 and a bore 57, with the second compartment 22 of said auxiliary body, and in the opposite direction, through a bore 58, with a conduit 59. Said conduit 59 enters the main body 11 in the region of the junction of the inlet and outlet ports 15 and 16, and projects into the main chamber 14, terminating adjacent the disc 25 and seat 24 so as to be exposed to fluid passed by said disc in the region of the maximum velocity thereof.

The sub-chamber 55 also communicates, through a bore 60, with an additional sub-chamber 61, the latter communicating in one direction, through a port 62 and the bore 57, with the second compartment 22 of the auxiliary body 13, and in the opposite direction, through a bore 63, with a conduit 64. The latter enters the outlet port 16 of the main body 11 and terminates in a region remote from the disc 25 and seat 24, preferably, facing away from the latter members so as to set up suction in the conduit as discharging fluid flows past the same.

The bore 54 is provided with a sleeve lining 65, the communication between the first compartment 21 of the auxiliary body 13 and the sub-chamber 55 afforded thereby being controlled by a second valve disc 66 mounted on a stem or push-rod 67. The latter is grooved, as at 68, and has its inner end slidably supported in a bearing 69 formed on the wall 33 of the auxiliary body 13.

An extension 70 of the second disc 66 is slidably mounted in the bore 60, said extension being grooved, as at 71, to provide the rear communication between the sub-chambers 55 and 61, said communication being controlled by a third valve disc 72 carried at the outer end of the push-rod 67. Thus, the second and third discs 66 and 72 are coupled for simultaneous operation.

The size of the port 62 is controlled by a needle valve 73 threadedly engaged in the wall 34 of the auxiliary body 13, and the outer end of the sub-chamber 61 is closed by a plug 74.

Finally, a cam nut 75 engages the threaded portion 35 of the stem 27 adjacent the inner end of the push-rod 67, the push-rod being maintained in a position to normally close the discs 66 and 72 by means of an expansion spring 76. The arrangement is such that movement of the stem 27 brings the cam 75 into engagement with the push-rod to simultaneously operate the second and third discs 66 and 72 against the action of the spring 76.

This completes the description of the aforesaid illustrative embodiment of the present invention and the mode of operation thereof may be summarized as follows:

As the pressure exerted by the fluid being controlled against the first disc 25 reaches a predetermined value, depending on the adjustment of the spring 40, said disc opens. The fluid commences to discharge through the chamber 14 and the outlet port 16. Opening of the disc 25 causes the cam 75 to engage, at a predetermined time, the push-rod 67 and slide the same so as to open the second and third discs 66 and 72 against the action of the spring 76.

A portion of the discharging fluid enters the conduit 59 with considerable velocity and reaches the sub-chamber 55. It here divides, major portions entering the first compartment 21 through the groove 68, and the sub-chamber 61 through the groove 71. A minor portion enters the second compartment 22 through the ports 56 and 57. The portion entering the sub-chamber 61 is returned to the main body of discharging fluid through the port 63 and conduit 64. A difference in fluid pressure is thus established between the compartments 21 and 22, with the greater pressure in the compartment 21. This pressure is exerted against the diaphragm 20 and aids the pressure against the first disc to help the latter quickly attain maximum opening.

As the pressure of the fluid being controlled is relieved, the first disc 25 commences to close under the action of the spring 40. At a predetermined time during the closing of this disc, the cam 75 becomes disengaged from the push-rod 67 and the discs 66 and 72 close under the action of the spring 76.

However, inasmuch as the disc 25 is still partially open, fluid continues to discharge and enter the sub-chamber 55 through the conduit 59. From here, it enters the ports 56 and 57, a portion flowing to the second compartment 22 and a portion flowing through the port 62 to the sub-chamber 61. From the latter, the fluid returns to the main stream through the port 63 and conduit 64.

The amount of fluid passing the port 62 depends on the setting of the needle valve 73. If the orifice is large, considerable fluid by-passes the compartment 22 and pressure in the latter builds up slowly. On the other hand, if the orifice is small, not much fluid can pass therethrough and the pressure in the compartment 22 builds up rapidly. In either event, this pressure is exerted against the diaphragm 22 to aid the spring 40 in closing the disc 25. It will be understood that if the pressure builds up slowly, the blow-down point of the valve will be primarily under the control of the blow-down ring 51, and the differential between the pop and blow-down points may be considerable. On the other hand, if the pressure builds up rapidly, the position of the blow-down ring 51 will be of minor significance and the valve will close nearer to its pop point.

This completes the description of the mode of operation of the safety valve of the present invention. It will be seen from all of the foregoing that a safety valve has been provided in which the disadvantages of prior devices, set forth in earlier portions of this specification, are eliminated. It will further be seen that a valve has been provided in which the fluid controlled thereby is caused to aid both in the opening and closing thereof. Finally, it will be appreciated that with the valve of the present invention, it becomes possible to employ smaller valves for a given installation than has heretofore been the case.

Other objects and advantages of the present invention will readily occur to those skilled in the art to which the same relates.

What is claimed is:

1. The combination of a body provided with main and auxiliary chambers; means providing communication with the interior of said main chamber; a first spring-pressed disc normally closing said communication; a pressure-responsive member disposed in said auxiliary chamber, and coupled to said first disc; means providing communication between said main and auxiliary chambers; a second spring-pressed disc normally closing said last-named communication; a cam coupled to said first disc; and a push-rod extending from said second disc to a point adjacent said cam; said cam engaging said push-rod during the operation of said first disc to actuate said second disc.

2. The combination of a body provided with main and auxiliary chambers; means providing communication with the interior of said main chamber; a first valve means controlling said communication; means maintaining said first valve means normally closed; a diaphragm peripherally mounted in said auxiliary chamber, and dividing the same into first and second compartments; said diaphragm being coupled at the center thereof to said first valve means; means providing communication between said main chamber and said first compartment, and between said main chamber and said second compartment; a second valve means controlling the communication between said main chamber and said first compartment; means maintaining said second valve means normally closed; and means effective during the operation of said first valve means to actuate said second valve means.

3. The combination of a first body provided with a main chamber; a second body provided with a first auxiliary chamber; a third body mounted intermediate said first and second bodies, and provided with a second auxiliary chamber; means providing communication with the interior of said main chamber; a first disc controlling said communication; a stem extending from said disc through said second auxiliary chamber and into said first auxiliary chamber; means mounted in said first auxiliary chamber and cooperable with said stem, maintaining said first disc normally closed; a diaphragm peripherally mounted in said third body, and dividing the same into first and second compartments; said diaphragm being coupled at the center thereof to said stem; means providing communication between said main chamber and said first compartment, and between said main chamber and said second compartment; a second disc controlling the communication between said main chamber and said first compartment; means maintaining said second disc normally closed; a cam mounted on said stem; and a push-rod extending from said second disc to a point adjacent said cam; said cam engaging said push-rod during the operation of said first disc to actuate said second disc.

4. The combination of a body provided with main and auxiliary chambers; means providing communication with the interior of said main chamber; a first valve means controlling said communication; means maintaining said first valve means normally closed; a pressure-responsive member disposed in said auxiliary chamber, and dividing the same into first and second compartments; said pressure-responsive member being coupled to said first valve means; means providing communication between said main chamber and said first compartment, and between said main chamber and said second compartment; a second valve means controlling the communication between said main chamber and said first compartment; means providing a by-pass to said main chamber of the communication between said main chamber and said second compartment; a third valve means controlling said by-pass; means maintaining said second and third valve means normally closed; and means effective during the operation of said first valve means to actuate said second and third valve means.

5. The combination of a body provided with main and auxiliary chambers; means providing communication with the interior of said main chamber; a first disc controlling said communication; means maintaining said first disc normally closed; a pressure-responsive member disposed in said auxiliary chamber, and dividing the same into first and second compartments; said pressure-responsive member being coupled to said first disc; means providing communication between said main chamber and said first compartment, and between said main chamber and said second compartment; a second disc controlling the communication between said main chamber and said first compartment; means providing a by-pass to said main chamber of the communication between said main chamber and said second compartment; a third disc controlling said by-pass; means maintaining said second and third discs normally closed; a cam coupled to said first disc; and a push-rod coupled to said second and third discs, and extending therefrom to a point adjacent said cam; said cam engaging said push-rod during the operation of said first disc to actuate said second and third discs.

6. The combination of a body provided with main and auxiliary chambers; a nozzle extending into said body and providing communication with the interior of said main chamber; a first disc cooperable with a seat on the inner end of said nozzle to control said communication; means maintaining said first disc normally closed; a pressure-responsive member disposed in said auxiliary chamber, and dividing the same into first and second compartments; said pressure-responsive member being coupled to said first disc; means providing communication between a point located in said main chamber adjacent said first disc and said seat, and said first compartment, and between said point in said main chamber and said second compartment; a second disc controlling the communication between said main chamber and said first compartment; means providing a by-pass to said main chamber of the communication between said main chamber and said second compartment; the main chamber end of said by-pass being remotely located with respect to said point adjacent said first disc and said seat; a third disc controlling said by-pass; means maintaining said second and third discs normally closed; and means effective during the operation of said first disc to actuate said second and third discs.

7. The combination of a body provided with main and auxiliary chambers; means providing communication with the interior of said main chamber; a first valve means controlling said communication; means maintaining said first valve means normally closed; a pressure-responsive member disposed in said auxiliary chamber, and dividing the same into first and second compartments; said pressure-responsive member being coupled to said first valve means; means providing communication between said main chamber and said first compartment, and between said main chamber and said second compartment; means providing additional communication between said main chamber and said second compartment; a second valve means controlling the communication between said main chamber and said first compartment; means maintaining said second valve means normally closed; means adjustably restricting the size of the additional communication between said main chamber and said second compartment; and means effective during the operation of said first valve means to actuate said second valve means.

8. The combination of a body provided with main and auxiliary chambers; means providing communication with the interior of said main chamber; a first valve means controlling said communication; means maintaining said first valve means normally closed; a pressure-responsive member disposed in said auxiliary chamber, and dividing the same into first and second compartments; said pressure-responsive member being coupled to said first valve means; means providing communication between said main chamber and said first compartment, and between said main chamber and said second compartment; means providing additional communication between said main chamber and said second compartment; a second valve means controlling the communication between said main chamber and said first compartment; means maintaining said second valve means normally closed; a manually adjustable needle valve restricting the size of the additional communication between said main chamber and said second compartment; and means effective during the operation of said first valve means to actuate said second valve means.

VICTOR WALLACE FARRIS.

References Cited in the file of this patent

UNITED STATES PATENTS

| Number | Name | Date |
|---|---|---|
| 1,229,726 | Ebeling | June 12, 1917 |
| 1,685,866 | Raymond | Oct. 2, 1928 |
| 2,035,129 | Hopkins | Mar. 24, 1936 |
| 2,165,611 | Campbell | July 11, 1939 |
| 2,271,516 | Tobin | Feb. 3, 1942 |
| 2,501,730 | McClure | Mar. 28, 1950 |